May 23, 1933. K. E. PORTER 1,910,563
ROD JOINT
Filed Dec. 5, 1930 3 Sheets-Sheet 1

INVENTOR.
Kenneth E. Porter
BY
Fay O'ferlin & Fay
ATTORNEYS.

May 23, 1933. K. E. PORTER 1,910,563
ROD JOINT
Filed Dec. 5, 1930 3 Sheets-Sheet 2

INVENTOR.
Kenneth E. Porter
BY
Fay Oberlin & Fay
ATTORNEYS.

Patented May 23, 1933

1,910,563

UNITED STATES PATENT OFFICE

KENNETH E. PORTER, OF CLEVELAND, OHIO

ROD JOINT

Application filed December 5, 1930. Serial No. 500,181.

This invention, as indicated, relates to a rod joint or coupling, and a method of making the same. More particularly it comprises a coupling especially adapted for use in connection with sucker rods, such as are used in oil wells of the West and South, which are often drilled to depths of from four to five thousand feet and require a construction which is adapted to withstand very severe strains and which at the same time will not impede the free flow of oil to the point of discharge. It also includes the method of making such coupling whereby a minimum of machining operations are employed, and whereby the coupling may be manufactured out of material such as is not ordinarily easily handled in machining operation.

The principal object of the present invention is to provide a sucker rod coupling which will dispense with the usual screw-threading arrangement at the ends thereof and will form a rigid joint free of lost motion, yet capable of being readily applied and easily disassembled. Another object of the invention is to provide a method of making a rod coupling through the use of upsetting and hot milling operations rather than through the usual machining operations, whereby a quality of steel of greater toughness may be used than would be possible were such other operations necessary. A further object of the invention is to provide means for locking the parts of the coupling in rigid relation to each other so that the same will not become separated during use. Another object of the invention is to so form the coupling as to provide ample space through the same for the free passage of oil so as not to impede the free flow of oil to the point of discharge. Other and further objects of the invention will appear in the course of the following description. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 2:
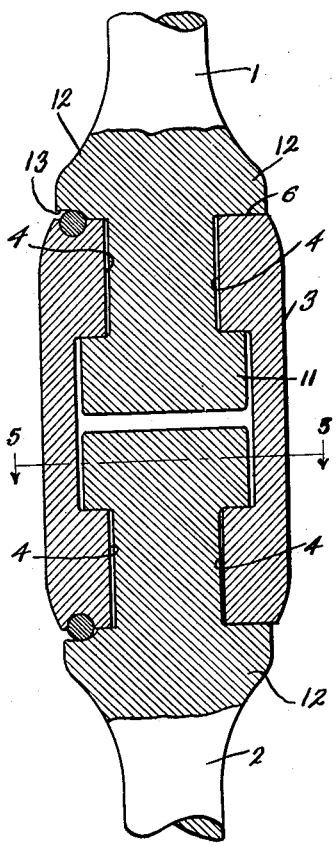
Figure 1:
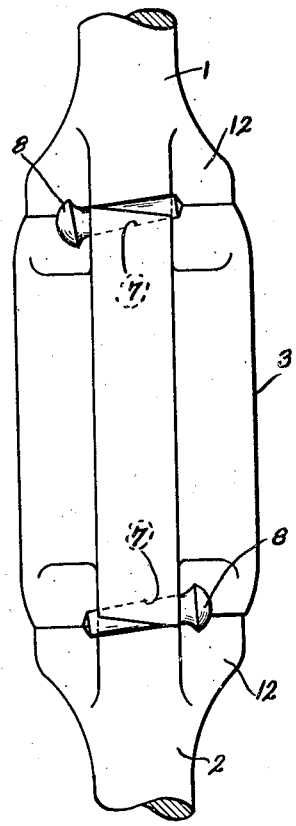
Figure 3:
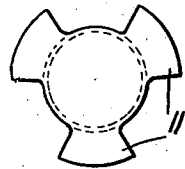
Figure 4:
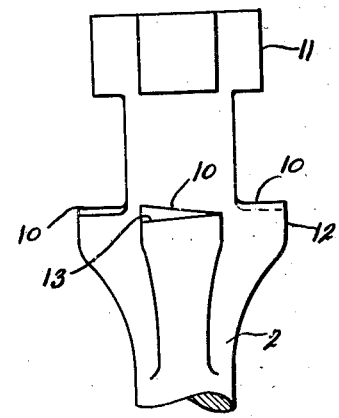
Figure 5:
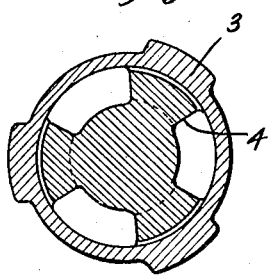
Figure 6:
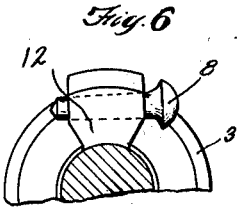
Figure 7:
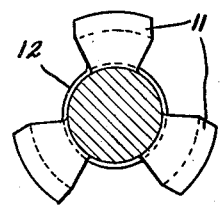
Figure 8:
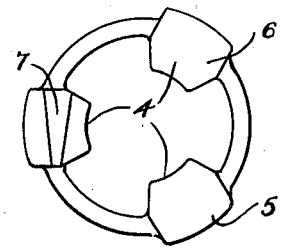
Figure 9:
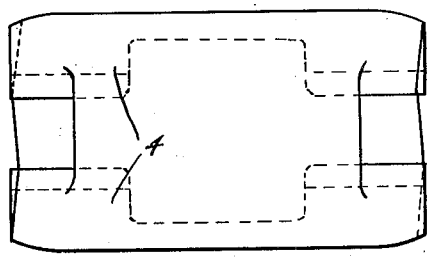
Figure 10:
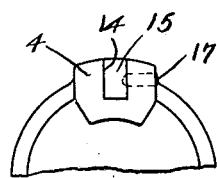
Figure 13:
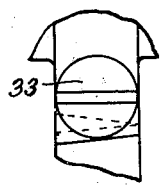
Figure 14:
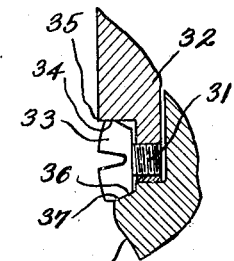
Figure 12:
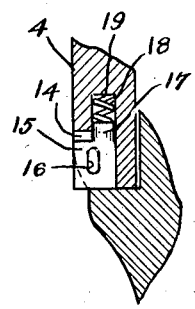
Figure 11:
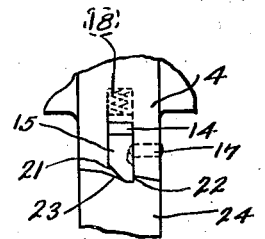
Figure 15:
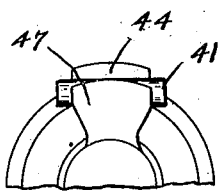
Figure 17:
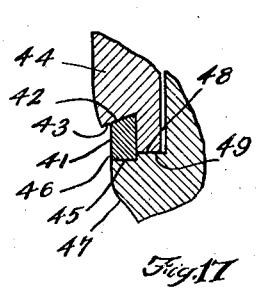
Figure 16:
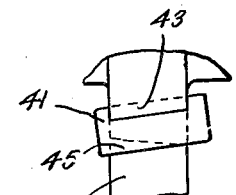
Figure 18:
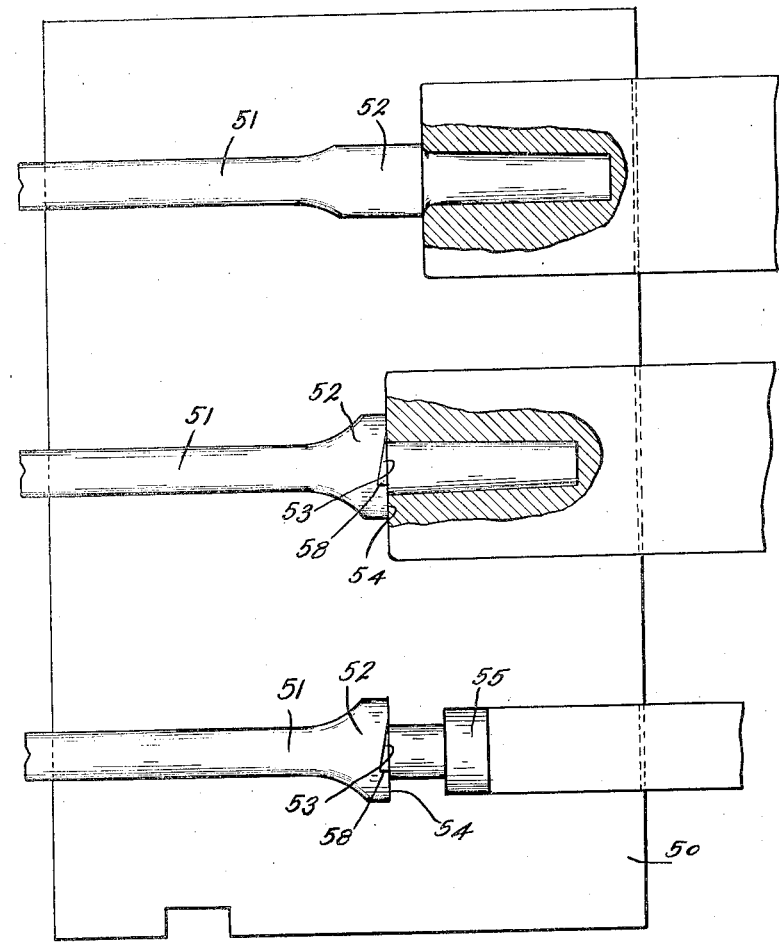
Figures 19, 20:
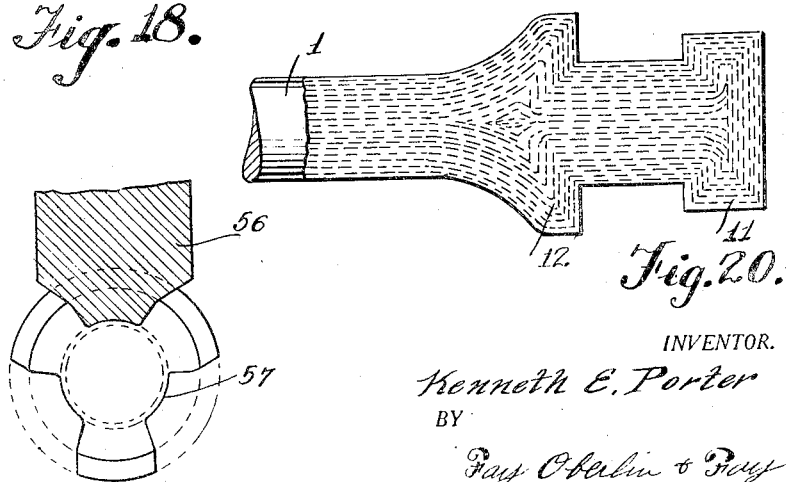

In said annexed drawings:

Fig. 1 is a front elevation showing a rod coupling embodying the principles of my invention; Fig. 2 is a view taken at right angles to that shown in Fig. 1, a portion thereof being shown in section; Fig. 3 is a view of the free end of one of the rods; Fig. 4 is a side elevation of one of the rod ends; Fig. 5 is a transverse sectional view taken along the line 5—5 shown in Fig. 2; Fig. 6 is a fragmentary top view showing one form of locking means; Fig. 7 is a view of one of the rods as seen from the shank portion thereof; Fig. 8 is an end view of the sleeve; Fig. 9 is a side view of the coupling sleeve; Fig. 10 is a top plan view of one form of locking device; Fig. 11 is a side elevation showing the locking device illustrated in Fig. 10; Fig. 12 is a fragmentary sectional view of the device shown in Figs. 10 and 11; Fig. 13 is a side elevation showing still another form of locking device; Fig. 14 is a fragmentary sectional view showing the locking device illustrated in Fig. 13; Fig. 15 is a fragmentary top plan view showing still another type of locking device; Fig. 16 is a side elevation of the device shown in Fig. 15; Fig. 17 is a fragmentary sectional view of the device shown in Figs. 15 and 16; Fig. 18 is a diagrammatic side elevation, partly in section, of fixed and movable die members illustrating the several steps in the process of producing rod ends for the coupling member; Fig. 19 is an end view, partly in section, of the end of the rod and a portion of a hot milling cutter; and Fig. 20 is a fragmentary sectional view of a rod terminal made according to the principles of my invention and showing the grain flow and fiber structure therein.

As is clearly shown in the drawings, the rod coupling comprises opposite rod ends 1, 2, joined by a sleeve 3, said members being provided with interengaging shoulders and held in locked position relative to each other.

The sleeve 3 is preferably formed with internal lugs 4, and may have longitudinal reinforcing ribs 5 external to said sleeve in alinement therewith, said lugs as shown in Figs. 8 and 9 being positioned adjacent the respective ends of the sleeve, and are preferably three in number adjacent each end. Said lugs each provide internal shoulders against which the rod ends are to be locked, as will be presently described. The upper end of each of the lugs is provided adjacent each end surface of the sleeve with an inclined surface 6 which is adapted to coact with a similarly inclined surface on the rod end. One of said lugs is formed with an oppositely inclined groove 7 which is adapted to receive a locking pin 8.

Each rod end is formed at its extreme end with two series of lugs 11, 12, the first series 11 providing shoulders adapted to cooperate with the shoulders of the sleeve, and the other series of lugs 12 having inclined faces 10 which are adapted to coact with the inclined surfaces 6 at the end of said sleeve. Each series of lugs comprises three lugs of slightly less size than the lugs on the sleeve with which they cooperate, and when the lugs on the rod are engaged with the lugs on the sleeve, the outer surface of the rod and the inner surface of the sleeve will be spaced, providing oil passageways intermediate said lugs.

With the device formed in the manner explained, the rod ends are engaged with the respective ends of the sleeve by engaging the lugs 11 in the spaces between the lugs of the sleeve and moving the rod end into the sleeve until the lugs 12 are in substantial alinement with the end of the sleeve when through the relative rotation of the sleeve and the rod end, the inclined faces are brought into coaction with each other, and cause the firm interengagement of said parts as the respective lugs are moved into substantial alinement with each other. In order to hold the lugs in engaged position, the pin 8 is inserted within the groove formed in the top surface of one of the lugs of the sleeve, and bears against a slightly cut away surface 13 adjacent one of the inclined surfaces 10 of the lugs 12. Inasmuch as the lugs 12 are engaged with the adjacent surfaces 6 of the sleeve with the inclined surfaces extending in one direction, and are held in locked position by means of a key or pin extending in a grooved slot inclined in the opposite direction, the respective members will be firmly held in locked position and any tendency to movement in either direction will be firmly resisted. Thus the entire strain of the rod in either direction of movement is taken on the lugs and end surfaces of the sleeve, and not on the locking device.

In place of using the locking pin of the type shown in Figs. 1, 2 and 6, it may be desirable to provide a latch member of the type illustrated in Figs. 10 to 12. With such form of locking device, one of the lugs 4 of the sleeve is formed with a slot 14 within which a slidable locking plate 15 is engaged, said plate preferably is formed with an elongated recess 16 adapted to engage the end of a pin 17 to provide for its free movement, yet to withhold the same from disengagement with the slot. The plate is formed with an extension 17 engaging within a recess 18 within which a coil spring 19 is provided. The plate preferably is formed with a bevel 21 on one side, and at its opposite side is adapted to engage the shoulder 22 forming one wall of a notch 23 provided in the inclined upper face 10 of one of the lugs 12 on the rod end.

In place of using a latch type of locking member, it may be found desirable to provide a set screw locking member of the type shown in Figs. 13 and 14. In said construction the sleeve is provided with a recess 31 adjacent the end of one of the lugs 32, said recess being screw-threaded to receive a set screw 33. The set screw is provided with a flat circumferential face 34 adapted to bear against a shoulder 35 formed on the lug, and is also formed with a bevel face 36 adapted to bear against an inclined surface 37 on the corresponding lug 38 of the rod end. Thus it will be possible by turning the screw to lock the elements firmly against disengaging action. Still another form of locking device is shown in Figs. 15 to 17 wherein a locking key 41 is provided, said key having an inclined upper surface 42 adapted to engage against a similarly inclined surface 43 under-cut into one of the lugs 44 of a coupling sleeve. The lower edge 45 of the locking key is adapted to seat against an inclined face 46 formed on the adjacent lug 47 of the rod end. The key 41 is slightly tapered and when engaged with the inclined surfaces 43 and 45 extends in a direction opposite to the surfaces 48, 49 of the lugs proper, a very secure locking engagement will be provided.

The method of forming the rod ends for the rod coupling above described is preferably carried out as follows: The rod end is subjected to a series of upsetting operations, as will appear from the diagrammatic view showing in Fig. 18. The rod end 51 is inserted within a die 50 which provides an enlargement 52 at a point spaced from the end thereof. It is thereafter subjected to a second upsetting operation which flattens and radially enlarges this upset portion 52 and provides three tapered surfaces 53 upon the shoulder 54 formed upon said upset surface. The extreme end of the rod end is then upset to provide an enlarged terminal portion 55 upon the same. Each of the enlarged or upset portions of the rod end is then acted upon by means of a hot milling cutter, 56, such as is shown in Fig. 19, which serves to cut away a space as great or somewhat greater than the width of the remaining material of said upset portions. Said spaces or slots 57 are preferably formed through the enlargements of the rod end at the positions of the respective set-off portions 58 formed through the providing of the inclined surfaces 53 on the enlarged section of the rod end.

The above outlined procedure of producing the axially spaced enlarged upset portions on the rod terminal produces a grain flow and fiber structure as most clearly illustrated in Figure 20. By separately upsetting the two enlarged portions, the grain flow is continuous in both enlarged sections with the body of the rod so that the strength of the coupling utilizing such projections as anchoring means is materially greater than if the rod end were upset in one solid enlargement and then circumferentially milled to provide the two axially spaced projections.

Through the cutting of the three slots longitudinally of the ends of the rods, so as to remove the material along three wide channel portions 57, there is left on each rod end, a series of three lugs, one series comprising the lugs 11 heretofore described, and the other series comprising the lugs 12. The lugs 11, as has been stated, are of substantially rectangular outline, as seen from the ends and are of lesser radial extent than the lugs 12. Each of the lugs 11 and 12 preferably has an inner portion of each lateral face extending radially in a direction toward the exact center of the rod end whereby the outer end of each lug is of greater width than its inner portion.

The sleeve may be formed by casting and machining operations, or may be formed as a flat forging and subsequently turned into cylindrical form and welded along its meeting edges. It may also be machined from a solid bar or formed from a section of tubing having the lugs stamped into the wall surface, or from a plate having lugs so stamped, said plate being then turned to cylindrical form and welded along its meeting edges. It will be noted that when the device is assembled that large straight passageways are provided intermediate the lugs on the sleeve and the rod ends through which oil may freely pass from the lower portion of the well in an upward direction. Thus, when the coupling is used in a sucker rod line, it does not provide any substantial obstruction to the free passage of oil to the surface.

The enlarged ends of the rod, it will be noted, provide an elevator rest whereby the rod may be engaged immediately beneath the second set of lugs by a suitable clamp or gripping plate, so that the assembling and disassembling of the rod sections may be readily brought about.

Through the use of a device of the character described, all threaded joints are dispensed with, and all danger is eliminated of pin fracture or rod fracture, which is quite prevalent where material of less toughness has to be used in order that extensive machining operations can be economically carried out. With the applicant's type of construction, steels of the most durable character may be fabricated into rod joints of such high degree of strength that any fracture of the rods or the coupling portions thereof is practically impossible. This is a matter of the utmost importance in connection with the working of deep oil wells, as breakage or fracture of the tools within the well often causes almost irreparable damage.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. A rod coupling comprising a sleeve provided internally adjacent each of the ends thereof with rod-engaging elements, rods having complementary engaging elements adapted to be inserted in the respective ends of said sleeve and moved into engaging position with said elements of said sleeve, inclined surfaces formed on said rods and on the adjacent ends of said sleeve for drawing said engaging elements into firmly locked position, and reversely inclined surfaces formed on said respective rods and sleeve ends, and means adapted to be inserted between said reversely inclined surfaces to prevent unlocking movement on said first-mentioned inclined surfaces.

2. A rod terminal for a rod joint comprising a plurality of axially spaced enlarged upset portions having grain flow and fiber structure continuous with said rod, one of said upset portions being at the extreme end of said rod and another of said upset portions being spaced therefrom, said intermediate section of said rod being of a diameter slightly greater than the original cross-section of said rod, and each of said upset portions having intermediate cutaway portions extending longitudinally of said rod and in alignment with the surface of said intermediate enlargement.

3. A rod terminal for a rod joint comprising a plurality of axially spaced enlarged upset portions on said rod with sections of such portions removed at intervals to provide outwardly projecting lugs integral with said rod and having grain flow and fibre structure continuous therewith, a substantially cylindrical sleeve provided with internally spaced lugs adjacent its ends for engagement with the lugs of respective rods, seats on the adjacent edge of the sleeve in alignment with the lugs on said sleeve, and lugs on one of the enlargements of said rod for engaging the seats on said sleeve when the lugs on said sleeve and rod are turned into longitudinal alignment, locking seats formed on a portion of one of said seats and a cooperating lug, adapted to receive a locking element.

4. A rod terminal for a rod joint comprising a plurality of axially spaced enlarged upset portions on said rod with sections of such portions removed at intervals to provide a plurality of rows of outwardly projecting lugs integral with said rod and having grain flow and fibre structure continuous therewith, the lugs in said rows being arranged in axial alignment, a substantially cylindrical sleeve provided with internally spaced lugs adjacent its ends for simultaneous engagement with the juxtaposed faces of said lugs of respective rods, seats on the adjacent edge of the sleeve in alignment with the lugs on said sleeve, and lugs on one of the enlargements of said rod for engaging the seats on said sleeve when the lugs on said sleeve and rod are turned into longitudinal alinement, locking seats formed on a portion of one of said seats and a cooperating lug, and a locking member adapted to engage said locking seats to prevent unlocking movement of said members.

5. A sleeve for a rod joint comprising a substantially cylindrical member provided with radially spaced lugs on its inner surface adjacent each end and provided with locking seats adjacent each end, and one of said seats being provided with a locking recess adjacent thereto.

6. A sleeve for a rod joint comprising a substantially cylindrical member provided with radially spaced lugs on its inner surface adjacent each end, external reinforcing ribs extending longitudinally of said sleeve in alinement with said lugs and inclined locking surfaces formed on the end surfaces of said sleeve in alinement with said lugs and reinforcing ribs.

7. A rod coupling comprising a sleeve provided internally adjacent each of the ends thereof with rod-engaging elements, rods terminally provided with a plurality of axially spaced enlarged upset portions with sections of such portions removed at intervals to provide a plurality of outwardly projecting lugs arranged in circumferentially and axially extending rows adapted to coact with the rod engaging elements on said sleeve to move the terminals of said rods into locking engagement with said sleeve, and a key arranged substantially transversely of said rods engageable with some of said lugs and said sleeve preventing relative movement between said rod terminals and said sleeve.

8. A rod terminal for a rod joint comprising a plurality of axially spaced upset portions, the grain and fiber structure in said rod and enlarged upset portions being unbroken throughout the extent of such rod end, one of said upset portions being substantially at the end of said rod and another of said upset portions being spaced therefrom.

9. A rod terminal for a rod joint comprising a plurality of axially spaced upset portions, the grain and fiber structure in said rod and enlarged upset portions being unbroken throughout the extent of such rod end, one of said upset portions being at the extreme end of said rod and another of said upset portions being spaced therefrom, and sections of said enlarged upset portions removed to provide a plurality of outwardly projecting lugs on said rod terminal.

Signed by me this 24th day of November, 1930.

KENNETH E. PORTER.